United States Patent
Caliostro

(10) Patent No.: US 12,026,582 B2
(45) Date of Patent: Jul. 2, 2024

(54) CROWD-SOURCED FAKE IDENTIFICATION REPORTING

(71) Applicant: Charles Caliostro, Bronxville, NY (US)

(72) Inventor: Charles Caliostro, Bronxville, NY (US)

(*) Notice: Subject to any disclaimer, the term of this patent is extended or adjusted under 35 U.S.C. 154(b) by 0 days.

(21) Appl. No.: 18/109,695

(22) Filed: Feb. 14, 2023

(65) Prior Publication Data

US 2023/0281407 A1    Sep. 7, 2023

Related U.S. Application Data

(60) Provisional application No. 63/315,924, filed on Mar. 2, 2022.

(51) Int. Cl.
*G06K 7/14* (2006.01)

(52) U.S. Cl.
CPC .................. *G06K 7/1413* (2013.01)

(58) Field of Classification Search
CPC .................................... G06K 7/1413
USPC ........................................ 235/380
See application file for complete search history.

(56) References Cited

U.S. PATENT DOCUMENTS

| | | | | |
|---|---|---|---|---|
| 8,627,939 B1* | 1/2014 | Jones | ..................... | G07D 11/24 194/207 |
| 9,466,082 B1* | 10/2016 | Dabiri | ..................... | G07F 11/004 |
| 2001/0021979 A1* | 9/2001 | Ito | ..................... | H04N 1/32144 713/189 |
| 2005/0111031 A1* | 5/2005 | Scott | ..................... | G07F 7/1075 358/440 |
| 2005/0171787 A1* | 8/2005 | Zagami | ..................... | G06Q 50/265 705/325 |
| 2009/0052751 A1* | 2/2009 | Chaney | ..................... | G06F 21/33 382/120 |
| 2009/0289443 A1* | 11/2009 | Okezie | ..................... | B60R 22/48 280/735 |
| 2009/0316950 A1* | 12/2009 | Alasia | ..................... | G06V 20/80 382/100 |

(Continued)

Primary Examiner — Allyson N Trail
(74) Attorney, Agent, or Firm — My Patent Guys; Christopher Pilling

(57) ABSTRACT

A crowd-sourced fake identification (ID) reporting system is provided. A central host communicates with a plurality of scanning devices over the internet. Each scanning device having an electronic visual display coupled to an ID scanner configured to scan an ID and obtain the information from the ID's barcode and/or magnetic strip. The plurality of scanning devices are configured to connect to the fake ID reporting software of the one or more internet-connected central servers and the Department of Motor Vehicles (DMV). A number of users each having a scanning device of the plurality of scanning devices; and, wherein the scanning device is configured to determine if an ID has been previously scanned by a scanning device of the plurality of scanning devices, to make a determination and provide the results of the validity of the ID. If the ID has not been previously scanned the system makes a determination of the validity of the ID by comparing the ID's data pattern to valid ID patterns in a data repository. The scanning device has a real-time DMV button configured to facilitate a real-time validation of the scanned ID with the DMV.

11 Claims, 3 Drawing Sheets

(56) References Cited

U.S. PATENT DOCUMENTS

| | | | |
|---|---|---|---|
| 2015/0117701 A1* | 4/2015 | Ross | G06V 10/225 |
| | | | 382/100 |
| 2016/0027021 A1* | 1/2016 | Kerdemelidis | G06Q 30/018 |
| | | | 705/317 |
| 2016/0034914 A1* | 2/2016 | Gonen | G06Q 30/0208 |
| | | | 705/318 |
| 2018/0068399 A1* | 3/2018 | Feinberg | G06Q 20/3224 |
| 2018/0102051 A1* | 4/2018 | Suthar | G08G 1/04 |
| 2020/0213299 A1* | 7/2020 | Yi | H04L 63/0876 |
| 2020/0234309 A1* | 7/2020 | Arora | G06T 7/13 |
| 2020/0380627 A1* | 12/2020 | Jarvis | G06Q 50/265 |
| 2021/0097623 A1* | 4/2021 | Kemble | G06F 16/9035 |
| 2021/0295017 A1* | 9/2021 | Aoyagi | G06V 30/413 |
| 2022/0253846 A1* | 8/2022 | Tobb | G06V 30/418 |
| 2023/0046591 A1* | 2/2023 | Neighbour | G06T 7/593 |

* cited by examiner

CROWD-SOURCED FAKE IDENTIFICATION REPORTING

CROSS-REFERENCE TO RELATED APPLICATIONS

The present application claims priority to U.S. Provisional Application 63/315,924, filed on Mar. 2, 2022, the disclosure of which is hereby incorporated in its entirety at least by reference.

BACKGROUND OF THE INVENTION

1. Field of the Invention

The present invention relates generally to checking IDs but more particularly to a crowd-sourced fake identification reporting system and method.

2. Description of Related Art

The process of checking state IDs and drivers licenses, conducted by merchants serving age-sensitive products and other businesses verifying ID documents is made more difficult by the prevalence of high-quality fake IDs in the hands of minors. Many businesses have invested in electronic ID scanners which scan the PDF417 barcodes printed on the back of driver's licenses. These barcode scanning devices are relatively low cost and contain a computing element and barcode decoding system which decodes the PDF417 barcode, extracts the data fields, calculates the age and warns when underage. The devices also record the scanned data to prove due diligence.

When the PDF417 barcodes were first added to state driver's licenses, the fake ID manufacturers were not skilled in properly creating these barcodes and many did not properly decode. However, the fake ID manufacturers have invested significant resources to mimic the security features on driver's licenses, including the barcodes, and therefore, minors are able to purchase age-sensitive products using fake IDs sold by a number of vendors over the internet. In short, the ability to detect fake IDs solely by scanning the PDF417 barcode has become ineffective because of the strides made by the fake ID manufacturers to enhance the likeness of their barcodes to those produced by the issuing authorities.

There are online DMV lookup systems that can determine the authenticity of the information contained in the PDF417 barcode printed on a driver's license document, but the cost is prohibitive for businesses serving relatively low-cost items such as tobacco or beer. A merchant selling cigarettes will not pay $1 or more to check each driver's license online for each sale. Consequently, a solution is needed.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In one aspect of the invention, a crowd-sourced fake identification (ID) reporting system is provided, comprising: one or more internet-connected central servers executing a fake ID reporting software from non-transitory media, the one or more internet-connected central servers connected to a data repository; a plurality of scanning devices having an electronic visual display, each scanning device coupled to an ID scanner configured to scan an ID and obtain the information from the ID's barcode and/or magnetic strip, wherein the plurality of scanning devices are configured to connect to the fake ID reporting software of the one or more Internet-connected central servers and the Department of Motor Vehicles (DMV); a number of users each having a scanning device of the plurality of scanning devices; and, wherein the scanning device is configured to determine if an ID has been previously scanned by a scanning device of the plurality of scanning devices, via communication with the fake ID reporting software, wherein if the ID has been previously scanned the system makes a first determination of the validity of the ID and; wherein if the ID has not been previously scanned the system makes a second determination of the validity of the ID.

In one embodiment, the first determination is that the scanned ID is a known fake, a valid ID, or is unknown. In another embodiment, if the first determination is unknown the system provides a data pattern status of the ID by comparing the ID's data pattern to valid ID patterns in the data repository. In another embodiment, the system further provides a risk score which quantifies the likelihood of the first or second determination being accurate. In yet another embodiment, the scanning device has a real-time DMV button configured to facilitate a real-time validation of the scanned ID with the DMV. In one embodiment, the system enables each user to report a scanned ID as a suspected fake ID.

In another aspect of the invention, a crowd-sourced fake identification (ID) reporting system is provided, comprising: one or more internet-connected central servers executing a fake ID reporting software from non-transitory media, the one or more Internet-connected central servers connected to a data repository; a plurality of scanning devices having an electronic visual display, each scanning device coupled to an ID scanner configured to scan an ID and obtain the information from the ID's barcode and/or magnetic strip, wherein the plurality of scanning devices are configured to connect to the fake ID reporting software of the one or more internet-connected central servers and the Department of Motor Vehicles (DMV); a number of users each having a scanning device of the plurality of scanning devices; and, wherein the scanning device is configured to determine if an ID has been previously scanned by a scanning device of the plurality of scanning devices, via communication with the fake ID reporting software, wherein if the ID has been previously scanned the system makes a first determination of the validity of the ID; wherein if the ID has not been previously scanned the system makes a second determination of the validity of the ID by comparing the ID's data pattern to valid ID patterns in the data repository; and, wherein the scanning device has a real-time DMV button configured to facilitate a real-time validation of the scanned ID with the DMV.

In yet another aspect of the invention, a crowd-sourced fake identification (ID) reporting method is provided, comprising steps: (a) providing one or more Internet-connected central servers executing a fake ID reporting software from non-transitory media, the one or more Internet-connected central servers connected to a data repository and a number of users each having a scanning device connected to the fake ID reporting software via the Internet; (b) scanning an ID via the scanning device; (c) determining if the ID has been scanned previously, wherein if the ID has not been scanned previously, the ID's data pattern is checked and compared to existing data patterns of valid IDs in the data repository; and, (d) providing ID validation results of the scanned ID on a user interface of the scanning device. The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a crowd-sourced fake identification reporting system and method.

It is to be understood that the terminology used herein is for the purpose of describing particular embodiments only and is not intended to be limiting. The terms "a" or "an," as used herein, are defined as to mean "at least one." The term "plurality," as used herein, is defined as two or more. The term "another," as used herein, is defined as at least a second or more. The terms "including" and/or "having," as used herein, are defined as comprising (i.e., open language). The term "coupled," as used herein, is defined as connected, although not necessarily directly, not necessarily mechanically, and not permanent. The term "providing" is defined herein in its broadest sense, e.g., bringing/coming into physical existence, making available, and/or supplying to someone or something, in whole or in multiple parts at once or over a period of time. As used herein, the terms "about," "generally," or "approximately" apply to all numeric values, whether or not explicitly indicated. These terms generally refer to a range of numbers that one of skill in the art would consider near the stated amount by about 0%, 5%, or 10%, including increments therein. In many instances these terms may include numbers that are rounded to the nearest significant figure. The term "real-time" means the actions are processed immediately.

Figure 1:
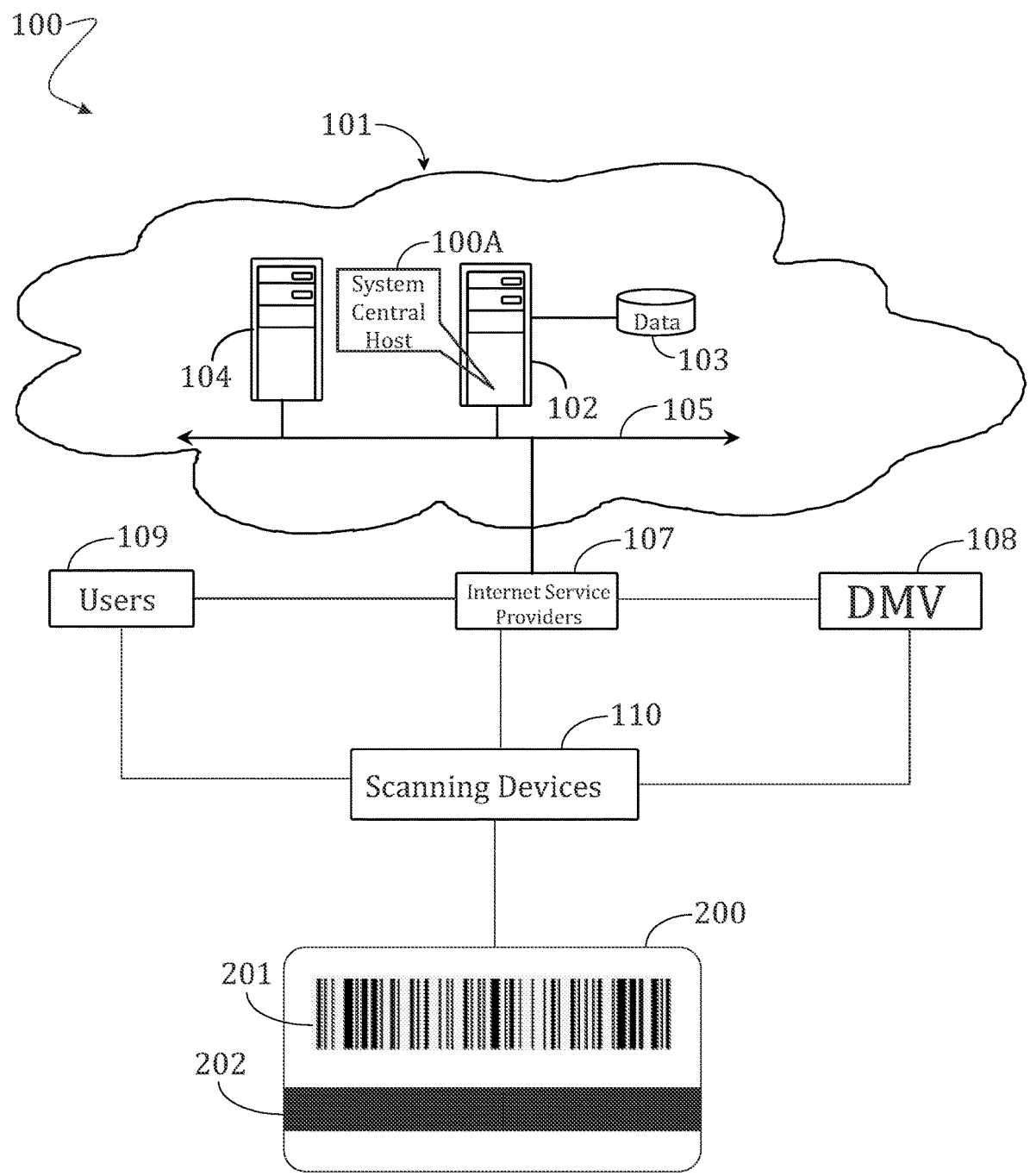
FIG. 1 is a network diagram of the crowd-sourced fake identification reporting system according to an embodiment of the present invention.

FIG. 1 is a network diagram of the crowd-sourced fake identification reporting system 100 according to an embodiment of the present invention. Referring to FIG. 1, the crowd-sourced fake identification reporting system 100 is illustrated. In one embodiment, the system comprises one or more internet-connected central servers 102 executing a central host software 100A from non-transitory media. Central server 102 is connected to a data repository 103, which may be any sort of data storage known in the art. The system further comprises a third party internet-connected server 104 connected to internet backbone 105. Although one third party internet-connected server 104 is shown, it is understood that potentially millions of other similar servers are connected to the internet via internet backbone 105. A number of users 109 are connected to the internet-connected central server 104 via an internet service provider (ISP) 107, allowing communication between the central server and the technicians. In some embodiments, the Department of Motor Vehicles (DMV) 108 is also connected to the internet-connected central server 102 via the ISP 107.

In some embodiments, the users 109 have access to scanning devices 110 configured to scan identification cards (IDs) or driver's licenses 200; herein all similar types may be referred to as IDs. The IDs 200 comprise a barcode 201 and/or a magnetic strip 202, wherein the barcode 201 and magnetic strip 202 comprises all the data retained on the ID as previously mentioned.

Figure 2:
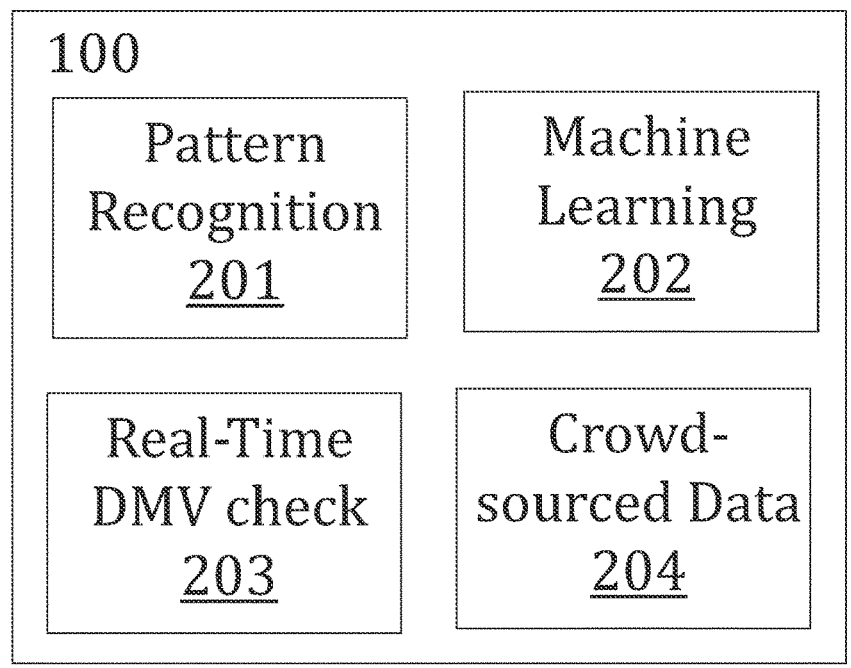
FIG. 2 is an illustration of the tools the crowd-sourced fake identification reporting system utilizes according to an embodiment of the present invention.

Referring now to FIG. 2, the crowd-sourced fake identification reporting system 100 utilizes a combination of pattern recognition 201, machine learning 202, real-time DMV check 203, and crowdsourced data 204 to identify and report confirmed or suspected fake IDs. Each of these methods will be discussed in greater detail below.

It is an object of the present invention to incorporate and leverage the expertise of a network of users familiar with ID document security features and reviewing a cardholder's behavior and physical characteristics. These expert users provide a low-cost and often improved method to identify fakes. They can analyze factors beyond the security features such as the card holder's behavior or physical appearance. This novel service captures and shares expert user's reports of suspected scanned IDs as "suspected fakes ID" and then warns other users that a previously scanned ID is potentially fake with a system calculated "risk" score. This will be discussed in greater details below.

Advantageously, in addition to providing a means to report suspicious IDs as fake, the system also provides the following features (a) pattern recognition to detect known fake ID barcode patterns; (b) a real-time DMV lookup to confirm the status of a potentially fake ID; (c) the ability to save and report ID results for previously examined IDs; and (d) a "risk" score on scanned IDs based on multiple factors such as fake ID reports, credibility or historical accuracy of those submitting the fake ID report, pattern recognition results, and other indicators of fake IDs.

The present invention is a crowdsourced fake ID system where members benefit from the collective efforts of its members in identifying fake IDs. The ability to capture and report suspected fake IDs leverages the collective expertise of a group of ID checkers, who have developed enhanced abilities after checking a large number of IDs. Providing optional real time DMV checks to operators helps them develop their skills plus immediately resolve any card holder claims of ID authenticity. By saving and reporting historical ID scan data, the crowdsourced Fake ID system provides a low cost solution which constantly improves as IDs are scanned, reviewed and saved.

Figure 3:
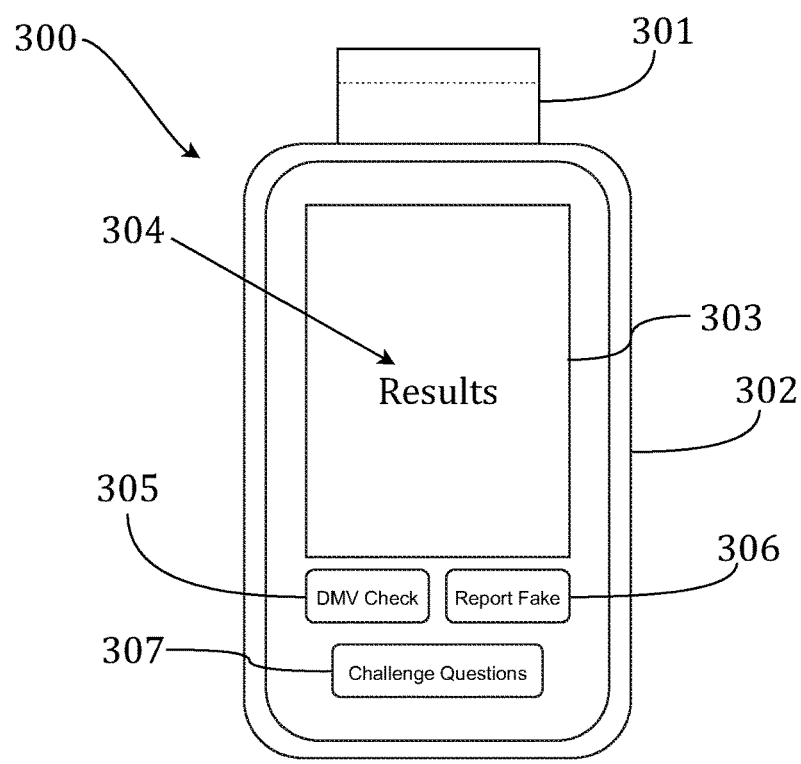
FIG. 3 is an exemplary ID scanner device according to an embodiment of the present invention.
Figure 4:
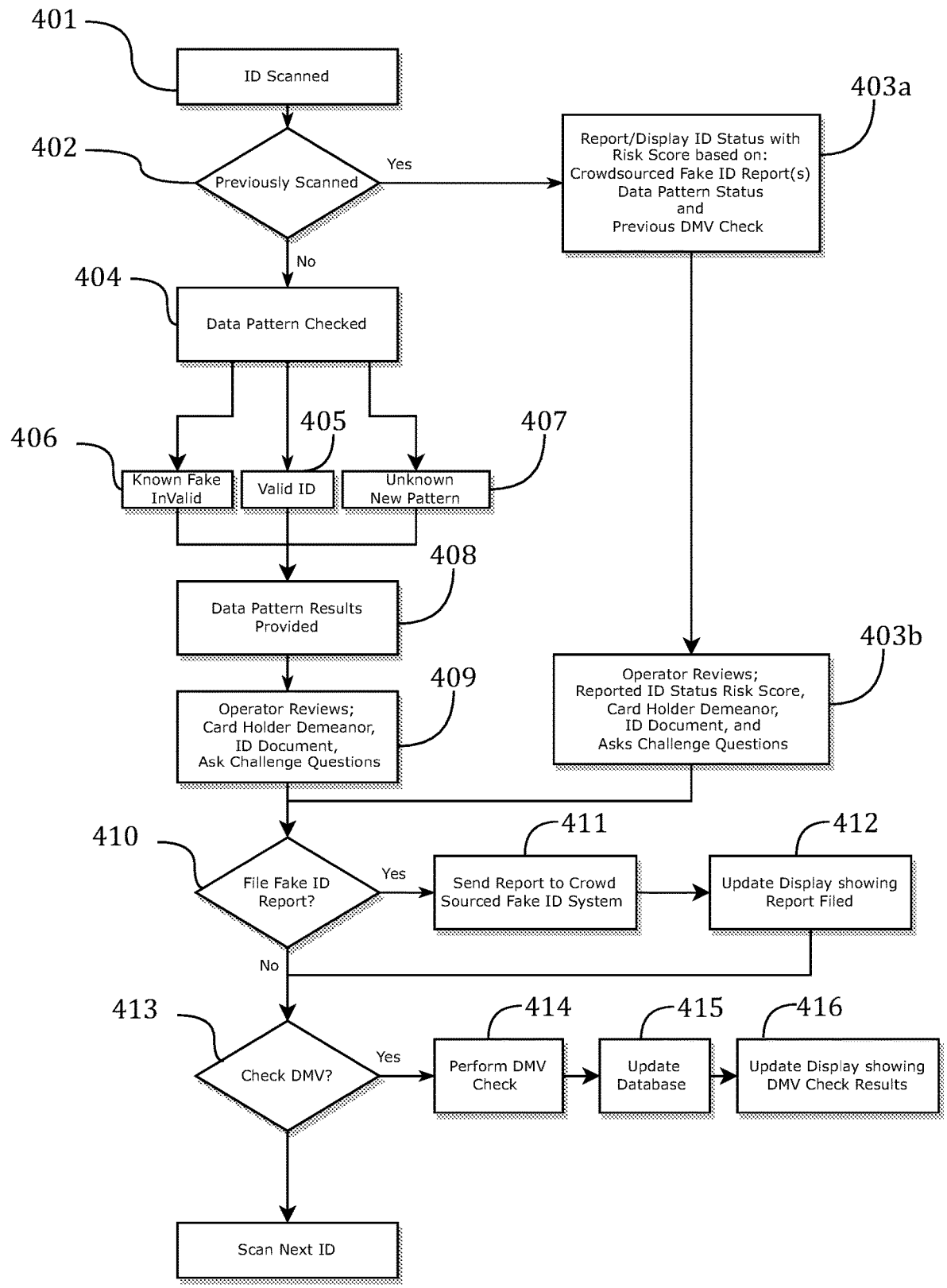
FIG. 4 shows the crowd-sourced fake identification reporting method according to an embodiment of the present invention.

Referring now to FIGS. 3-4, a method for the crowd-sourced fake identification reporting system is illustrated. FIG. 3 shows one embodiment of a scanning device 300, with ID scanner 301, and exemplary user interface 302. In the instance shown, the system is hosted and shown on a smartphone with integrated ID scanner, but it should be understood that the scanning device may be a standalone device. In one embodiment, the user interface (UI) 302 includes text on an LCD screen 303 or similar for providing results 304 and a DMV check button 305. In some embodiments, the scanning device 300 includes a report fake button 306, as well as a challenge questions button 307, which will provide challenge prompts on the LCD screen 303. This will be described in greater details below.

FIG. 4 illustrates the method steps for the crowd-sourced fake identification reporting system. Referring now to FIG. 4, in step 401, an ID is scanned and a determination is made if it has been scanned before 402, and the report from the previous scan if applicable is provided. More specifically, if yes, the results 403a are provided, wherein the results include a report/display ID status with a risk score which quantifies the likelihood of the results to be accurate based on previous scans including but not limited to, crowd-sourced fake ID reports, data pattern status, and any previous DMV checks. Next, in step 403b, the operator or user of the scanning device, reviews the provided results, while reviewing the card holder's demeanor, ID documentation, and if desired, may prompt the user with the challenge questions generated by the scanning device, via button 307 as previously described.

Referring back to method step 402, an ID is scanned and a determination is made if it has been scanned before 402. If no, the data pattern is checked 404, which will determine if the ID scanned is a valid ID 405, a known fake (invalid ID) 406, or an unknown (new pattern) 407. Next, the data pattern results 408 are provided. Next, in step 409, the operator or user of the device, reviews the card holder's demeanor, ID documentation, and if desired, may prompt the user with the challenge questions generated by the scanning device, via button 307.

When applicable, based on any of the previous method steps above, in step 410, the operator may file a fake ID report (via 306; FIG. 3). Next, in step 411, the report is then sent to the crowd sourced fake ID system (100a; FIG. 1), which updates the display (303; FIG. 3) of the scanning device showing the report has been filed 412.

If a report has not been filed, in step 413, the operator may utilize the check DMV (via 304; FIG. 3). This prompts a DMV check in 414, the database (such as data repository 103; FIG. 1) is updated in 415, and the display shows the DMV check results on the scanning device 416. The DMV check is performed in real-time.

Regarding the data pattern status of 407, if the ID is neither known fake or valid, but present in the database (such as data repository 103), then its "data pattern status" and any fake ID reports with details will be provided to the user as previously described.

In some embodiments, the "risk" score quantifies the likelihood of the results or the likelihood the scanned ID is valid or invalid. In some embodiments, this may be a percentage, or a number from 1-100, or 0-10. The "risk" score offers the user or examiner of the ID to have confidence in making the determination that the ID is real or fake. The "risk" score will also help the user or examiner make the determination if a DMV check is necessary.

Users, via the DMV check button 305, will be enabled to perform an online real-time DMV check of a recently (or previously) scanned ID still in local memory in the data repository for a fee. The results will be reported immediately to the user and to other users when the same ID is scanned. This is an important element of the system as it allows all users to benefit from this one-time DMV check, without requiring multiple DMV checks for the same ID.

Still referring to FIGS. 3-4, if an ID has not been scanned before (not found in the database), then the system will check this new ID's "data pattern" against the existing library of "valid" patterns, record the ID with its "data pattern" status, to determine if the ID is valid or invalid. In the event the data pattern is new (does not match data patterns in the library), then this will be reported 408 to the user in a cautionary manner "unrecognized data format," recorded in the database, and flagged for future classification. The user can run a DMV check, prompt challenge questions, review the card holder demeanor, file a fake ID report, etc. and these events will also be captured and stored in the database. In some embodiments, in the event a real-time DMV check indicates this new "unrecognized data pattern" belongs to a fake ID, then the system may automatically put this new data pattern into the known fake data pattern list. Alternatively, if this new data pattern belongs to a valid ID, then the new data pattern will be added to the known valid data pattern list.

Regarding the data pattern status of a scanned ID, the system using pattern recognition and/or machine learning will identify "ID data patterns" found in fake and valid IDs. While this will identify some poorly made fake IDs, its already known that certain fake ID manufacturers are able to fully mimic the barcode data patterns and therefore these machine learning algorithms will not be able to identify all fake IDs and fewer over time, as fake ID manufacturers continue to improve their fake ID production technology. However, as more pattern data is stored, and cross-verified with DMV checks, the system will be able to improve identification of suspected fake IDs for future ID scans. As well known in the art, the data patterns come from extracting the formatting elements and field data values from the machine-readable data stripes, i.e. from the encoded in PDF417 barcodes, which conform to the standard created and maintained by the American Association of Motor Vehicle Administrators (AAMVA).

As previously mentioned, a user will be able to report suspected fake IDs, wherein the suspected fake IDs will be shared with other users when the same ID is scanned. In addition to reporting an ID as a suspected fake, the user will be able to include a justification, which enables other users to judge the credibility of the report. In some embodiments, exemplary justifications include but are not limited to, ID not laminated, ID failed bend test, owner of ID declined option to have DMV lookup performed, ID missing security feature(s), know the person's true age, ID portrait didn't match—i.e. not their ID, person failed challenge question(s), or another reason.

In some embodiments, the system will track user accounts and their accuracy for reporting fake IDs. In some embodiments, the system will allow users to enter credit card information to pay for any subscription costs and the cost of DMV queries. In some embodiments, users may earn reward points or become part of a ranking system so other users may track their abilities. Advantageously, the purpose of this accuracy tracking feature is to provide other users with a confidence level for fake ID reports. It also allows the system to hide reports from users who are attempting to fool other users with false fake ID reports. For example, in some embodiments, fake ID reports may not be visible for new users until they have a predetermined number of confirmed fake ID reports, such as ten confirmed fake ID reports.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A crowd-sourced fake identification (ID) reporting system comprising:
one or more internet-connected central servers executing a fake ID reporting software from non-transitory media, the one or more Internet-connected central servers connected to a data repository;
a plurality of scanning devices having an electronic visual display, each scanning device coupled to an ID scanner configured to scan an ID and obtain the information from the ID's barcode and/or magnetic strip, wherein the plurality of scanning devices are configured to connect to the fake ID reporting software of the one or more Internet-connected central servers and the Department of Motor Vehicles (DMV);
a number of users each having a scanning device of the plurality of scanning devices;
wherein the scanning device has configured to determine if an ID as been previously scanned by a scanning device of the plurality of scanning devices, via communication with the fake ID reporting software, wherein if the ID has been previously scanned the system makes a first determination of the validity of the ID;
a user from the number of users is enabled to file a fake ID report associated with the scanned ID, wherein the fake ID report comprises user input logged by the user;
wherein the system calculates and displays a risk score which incorporates the first determination of the validity of the ID and the fake ID report; and;
wherein if the ID has not been previously scanned the system makes a second determination of the validity of the ID.

2. The crowd-sourced fake ID reporting system of claim 1, wherein the first determination is that the scanned ID is a known fake, a valid ID, or is unknown.

3. The crowd-sourced fake ID reporting system of claim 2, wherein if the first determination is unknown the system provides a data pattern status of the ID by comparing the ID's data pattern to valid ID patterns in the data repository.

4. The crowd-sourced fake ID reporting system of claim 3, wherein the system further provides a risk score which quantifies the likelihood of the second determination being accurate.

5. The crowd-sourced fake ID reporting system of claim 1, wherein the scanning device has a real-time DMV button configured to facilitate a real-time validation of the scanned ID with the DMV.

6. A crowd-sourced fake identification (ID) reporting system comprising:
one or more internet-connected central servers executing a fake ID reporting software from non-transitory media, the one or more internet-connected central servers connected to a data repository;
a plurality of scanning devices having an electronic visual display, each scanning device coupled to an ID scanner configured to scan an ID and obtain the information from the ID's barcode and/or magnetic strip, wherein the plurality of scanning devices are configured to connect to the fake ID reporting software of the one or more Internet-connected central servers and the Department of Motor Vehicles (DMV);
a number of users each having a scanning device of the plurality of scanning devices;
wherein the scanning device is configured to determine if an ID has been previously scanned by a scanning device of the plurality of scanning devices, via communication with the fake ID reporting software, wherein if the ID has been previously scanned the system makes a first determination of the validity of the ID;
a user from the number of users is enabled to file a fake ID report associated with the ID, wherein the fake ID report comprises user input logged by the user;
wherein the system calculates and displays a risk score which incorporates the first determination of the validity of the ID and the fake ID report;
wherein if the ID has not been previously scanned the system makes a second determination of the validity of the ID with a data pattern status of the ID by comparing the ID's data pattern to valid ID patterns in the data repository; and,
wherein the scanning device has a real-time DMV button configured to facilitate a real-time validation of the scanned ID with the DMV.

7. The crowd-sourced fake ID reporting system of claim 6, wherein the first determination is that the scanned ID is a known fake, a valid ID, or is unknown.

8. The crowd-sourced fake ID reporting system of claim 7, wherein if the first determination is unknown the system provides a data pattern status of the ID by comparing the ID's data pattern to valid ID patterns in the data repository.

9. The crowd-sourced fake ID reporting system of claim 8, wherein the system further provides a risk score which quantifies the likelihood of the second determination being accurate.

10. A crowd-sourced fake identification (ID) reporting method comprising steps:
   (a) providing one or more Internet-connected central servers executing a fake ID reporting software from non-transitory media, the one or more Internet-connected central servers connected to a data repository and a number of users each having a scanning device connected to the fake ID reporting software via the Internet;
   (b) scanning an ID via the scanning device;
   (c) determining if the ID has been scanned previously, wherein if the ID has not been scanned previously, the ID's data pattern is checked and compared to existing data patterns of valid IDs in the data repository;
   (d) searching if a fake ID report associated with the ID has been previously filed by a user of the number of users; and,
   (e) providing ID validation results of the scanned ID on a user interface of the scanning device, wherein the ID validation results incorporates the fake ID report and includes a risk score.

11. The crowd-sourced fake ID reporting method of claim 10, further comprising a step of performing a real-time Department of Motor Vehicles (DMV) validation check directly from the scanning device.

* * * * *